UNITED STATES PATENT OFFICE.

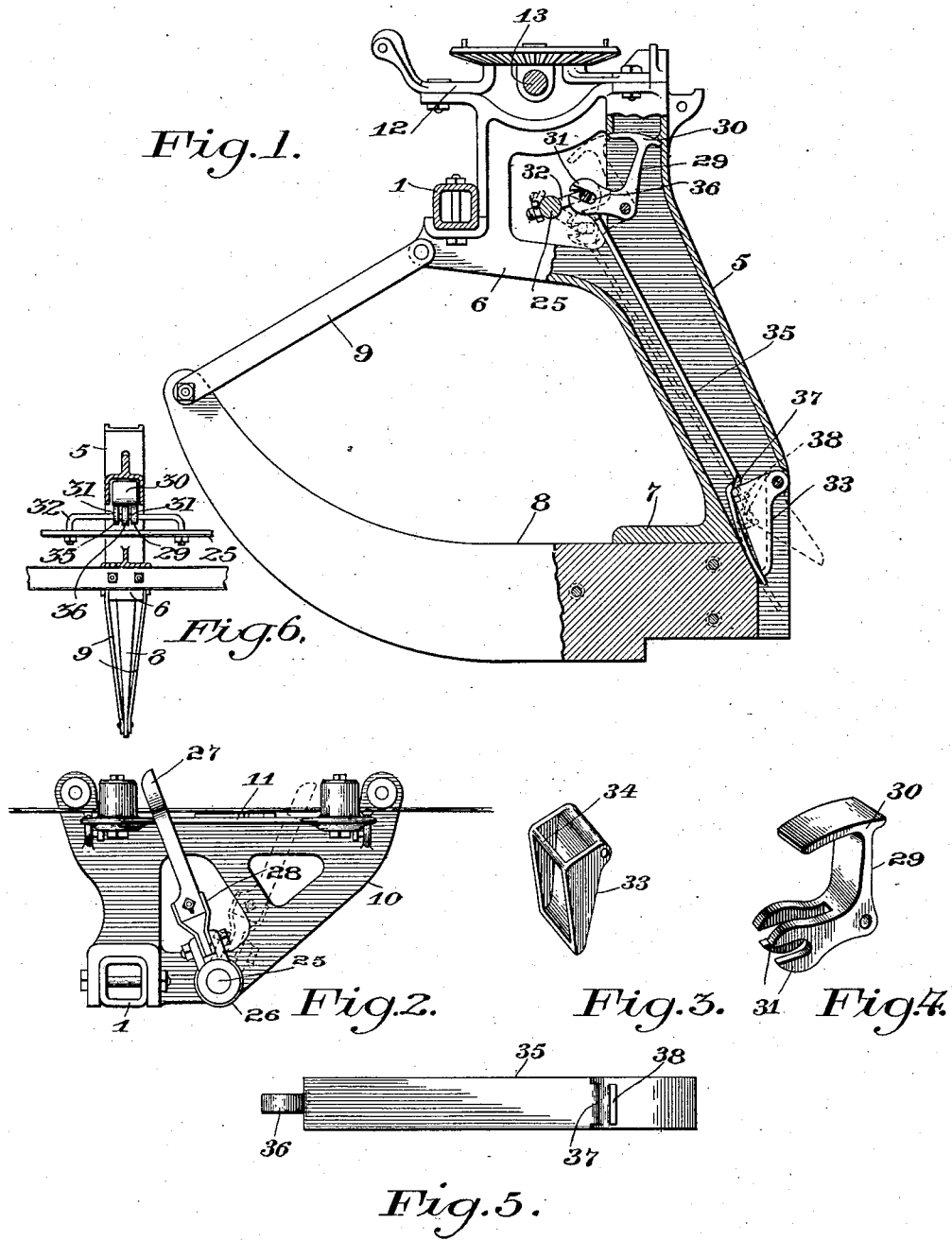

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,024,768.  Specification of Letters Patent.  Patented Apr. 30, 1912.

Application filed May 25, 1911. Serial No. 629,270.

*To all whom it may concern:*

Be it known that I, SAMUEL K. DENNIS, a citizen of the United States, residing at Chicago, in the county of Cook and State of Illinois, have invented certain new and useful Improvements in Corn-Planters, of which the following is a specification.

My invention relates to corn planters, and in particular to the manner of mounting the seed valves in the seed conduit, their construction and the means for operating them, and consists in an improved form of first and second drop valves and to improved means for connecting them with the planter mechanism; the object of my invention being to provide a mechanism that will be reliable in operation, insure accurate planting and not liable to disarrangement. I attain this object by means of the mechanism illustrated by the accompanying drawing, in which—

Figure 1 is an end elevation of the rotary frame and seed conduit, partly in section and partly cut away in a manner to illustrate the operation of the valve mechanism; Fig. 2 is a side elevation of one of the check wire guiding frames and designed to illustrate the operation of part of the clutch tripping mechanism; Fig. 3 is a view in perspective of a second drop valve; Fig. 4 is a view in perspective of a first drop valve; Fig. 5 is a plan view of a detail part of the valve operating mechanism; and Fig. 6 represents a top plan view of part of the runner frame of a planter and designed to illustrate the manner of connecting the valve mechanism with an operative part of the planter mechanism.

The same reference characters designate like parts throughout the several views.

1 represents a transverse bar forming part of the runner frame of a corn planter.

5 represents a seed conduit having a forwardly projecting bracket portion 6 at the upper end thereof whereby it is secured to the runner frame bar 1, and a toe extension 7 at the lower end thereof to which is secured the rear ends of the furrow opening runners 8 that have their forward upturned ends connected with the upper bracket portion by means of a brace member 9.

10 represents a bracket member secured to the end of the runner frame bar 1 and pivotally mounted upon the bracket are check wire guides 11 having a common form and operative in a well-known way.

12 represents a base member secured to the upper end of the seed conduit and to which the seed hopper (not shown) may be hinge connected, and 13 represents an operating shaft mounted in bearings carried by the base member and adapted to transmit motion to a part of the seed delivering mechanism.

A rock shaft 25 is journaled in a bearing 26 forming part of the bracket member 10, and 27 represents a common form of forked lever arm pivotally connected with a sleeve 28 secured to the rock shaft, the arm being permitted to swing laterally and to engage with tappets upon the check wire in the usual way, it being understood that duplicates of the check wire tripping mechanism are mounted upon opposite ends of shaft 25.

29 represents a first drop valve pivotally mounted at the upper end of the seed conduit, having a head portion 30 formed concentric with the axis thereof and adapted to open or close the upper end of the conduit as the valve swings about its pivot, and forwardly extending forked members 31 at its lower end that are spaced apart and adapted to engage with the U-shaped lever member 32 secured to the shaft 25, the head portion of the U-shaped member being arranged parallel with the rock shaft in a manner permitting the seed conduit to be adjusted bodily laterally along the runner frame bar for the purpose of varying the distance between the furrows, as is common in the construction of this class of machines.

33 represents a second drop valve pivotally mounted at the lower end of the conduit, made in box-like form, open at its upper end and front side, and having its axis of movement at its upper rear edge and adapted, when closed, to form a lower extension of the seed conduit, the side walls of the valve having their front upper corners connected by means of a transverse bar 34 and having the rear wall thereof curving forward at its lower end.

35 represents a valve operating bar having at its upper end an eye portion 36 that loosely receives the U-shaped lever member 32 between the forked members 31 of the first drop valve 29, and near its lower end provided with a shoulder portion 37 that engages with the transverse bar 34 in a manner to rock the valve upon its axis in one direction, and 38 represents a rib arranged transversely across the valve operating bar and spaced apart at the shoulder, the intervening space being adapted to receive the bar 34 in a manner whereby the valve is opened and closed positively by a longitudinal movement of the valve operating bar. The lower end of the valve operating bar is extended in a manner to form the front wall of the box valve when the latter is in a closed position and to form a guide for the dropping seed when the valve is in an open position, as shown in Fig. 1. A rocking movement of the shaft 25 rearwardly rocks the first and second drop valves about their axes in a manner to release the seed therefrom, and the rocking of the shaft in an opposite direction closes the valve.

What I claim as my invention and desire to secure by Letters Patent, is:

A valve mechanism for corn planters having, in combination, a seed conduit, a rock shaft, a rocking gate valve mounted in the upper end of said seed conduit, a lever arm carried by said rock shaft and engaging directly with said gate valve, a box-like valve having its upper rear corner pivotally mounted in the lower end of said seed conduit, said box-like valve being open at its upper end and along its front side, a longitudinally movable bar having its upper end connected with said lever arm and its lower end normally closing the front side of said box-like valve in a manner forming an extension of said seed conduit, said bar engaging with said box valve in a manner to open and close it simultaneously with an opening and closing movement of said gate valve.

SAMUEL K. DENNIS.

Witnesses:
 EVAN EVANS,
 HERBERT DEKKEI.

Copies of this patent may be obtained for five cents each, by addressing the "Commissioner of Patents, Washington, D. C."